United States Patent [19]

Jackson

[11] 4,290,181

[45] Sep. 22, 1981

[54] BALL JOINT FORMING METHOD AND APPARATUS THEREFOR

[75] Inventor: Robert W. Jackson, South Bend, Ind.

[73] Assignee: The Bendix Corporation, Southfield, Mich.

[21] Appl. No.: 87,597

[22] Filed: Oct. 22, 1979

[51] Int. Cl.³ ............................................ B23P 25/00
[52] U.S. Cl. ................................ 29/458; 29/149.5 B; 264/242; 264/264
[58] Field of Search .................. 264/242, 264; 29/441, 29/434, 458, 149.5 B

[56] References Cited

U.S. PATENT DOCUMENTS 3,218,383 11/1965 White ................................. 264/242
3,259,963 7/1966 White ................................. 264/242

Primary Examiner—James H. Derrington
Attorney, Agent, or Firm—Paul D. Schoenle; Ken C. Decker

[57] ABSTRACT

A method for constructing ball joints includes positioning a ball within a ball joint socket. Plastic-bearing material is then allowed to congeal in the socket while in contact with the ball. A positioning fixture maintains the ball in the desired spaced position in the socket while also maintaining a seal between the ball and the socket housing so that the bearing material may be pressurized as it congeals.

1 Claim, 4 Drawing Figures

BALL JOINT FORMING METHOD AND APPARATUS THEREFOR

BACKGROUND OF THE INVENTION

This invention relates to a method of constructing ball joints and an apparatus or fixture for use in that method.

Ball joints are well known in the art and usually comprise a ball on the end of a stud or shank (commonly referred to as a "ball stud") which is received in a cavity or socket in a housing and supported by a resilient bearing member also received in the cavity. A typical ball joint, such as is disclosed in U.S. Pat. No. 3,679,248, is constructed as follows: First, the bearing member, the ball stud, and the housing are separately formed and machined. Second, the ball end of the stud is inserted into the bearing member. The ball and bearing member are then pressed into the machined socket in the ball joint housing. Finally, a retaining ring is attached to the housing or the housing is deformed or crimped to hold the ball and bearing within the housing. This method requires precision machining of the mating surfaces of the bearing member and of the housing separately so that the bearing member may be pressed into the housing without destroying the bearing member and so that the bearing member is properly stressed so that a proper load is maintained on the ball.

SUMMARY OF THE INVENTION

An advantage of this invention is that there is provided a simpler and less expensive method that prior art methods of constructing ball joints and in which the number and complexity of housing and bearing machining steps is reduced.

Another advantage of this method is that a single socket can be used with ball studs of various sizes since the bearing material must necessarily conform to the space between the assembled ball and housing.

A further advantage of this invention is that, since the bearing surface is formed while in contact with the ball, the bearing material has a long wearing bearing surface which is closely matched to that of the ball.

Another advantage of this invention is that there is provided a single fixture which positions the ball in the ball joint socket and which seals between the ball stud and the socket housing so that a plastic bearing material may be injected into the cavity between the ball stud and the socket housing and held under pressure.

These advantages are achieved in that the present invention provides a ball joint construction method wherein the plastic bearing member is molded in the ball joint socket while in contact with the ball. A positioning fixture holds the ball in the socket in a spaced position relative to the housing. The positioning fixture also seals between the ball and the housing. Plastic bearing material is then injected into the socket around the ball and allowed to congeal while under pressure. The ball may be rotated as the bearing material congeals to insure that the bearing material forms a suitable bearing surface next to the ball. The result of this process is an inexpensive pre-loaded ball joint with wear take-up capability.

DETAILED DESCRIPTION

Figure 2:
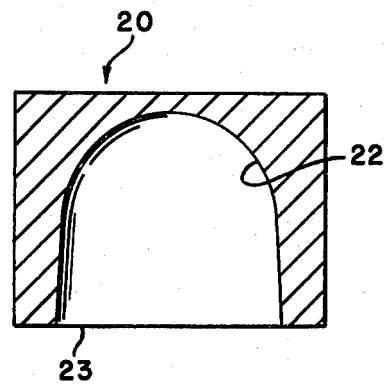
FIG. 2 is a cross-sectional view of a ball joint housing blank with a ball-receiving cavity.
Figure 3:
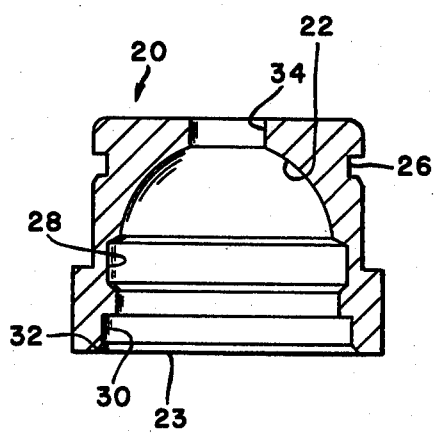
FIG. 3 is a cross-sectional view of a machined ball joint housing made from the blank illustrated in FIG. 2.

Referring now to the drawing, a ball joint assembly 10 manufactured pursuant to applicant's invention includes a finished housing 12 which receives a ball-ended stud 14 and a bearing 16. A retaining ring 18 holds the ball-ended stud 14 and the bearing 16 within the housing 12. Applicant's method of constructing this ball joint includes forming a housing blank 20 with a substantially spherical cavity 22 and with a ball-receiving or open end 23 formed therein as shown in FIG. 2. The blank 20 may be formed by hot forming, cold impact, powdered metal, impact extruding, or any other suitable process. The cavity 22 need not be machined to close tolerances since the surface of the housing which defines the cavity 22 is not used as a ball engaging bearing surface in the completed ball joint 10. The outer and inner surfaces of the blank 20 may be machined as desired as shown in FIG. 3. For example, retaining ring groove 26 may be machined on the outer surface of blank 20. Similarly, bearing material retaining groove 28, retaining ring groove 30 and chamfer 32 may be machined on the inner surface of housing blank 20. Finally, the housing blank 20 is provided with a bore 34 through which bearing material 14 may later be injected.

Figure 4:
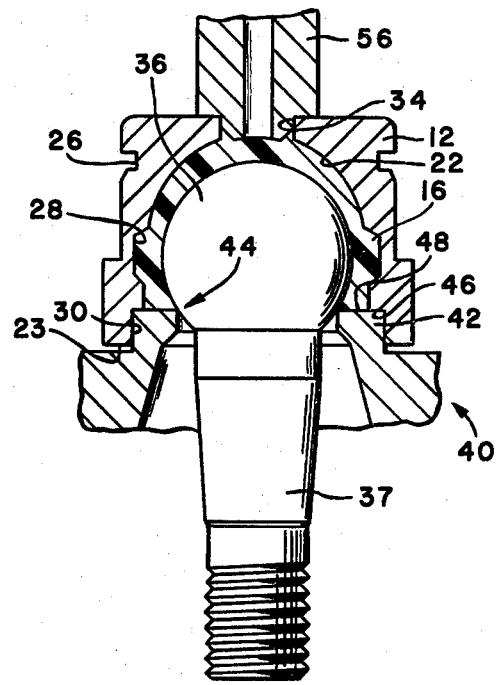
FIG. 4 is a cross-sectional view showing applicant's positioning fixture and an injection molding fixture along with the ball joint.

The ball 36 on the end of stud 14 is then inserted through the open cavity end 23 and into a spaced position relative to housing 12 within cavity 22, as shown in FIG. 4. Positioning fixture 40 may be used to hold the ball 36 in the desired spaced position within cavity 22 as is also illustrated in FIG. 4. Positioning fixture 40 includes a housing engaging portion 42, which may be adapted to mate with retaining ring groove 30. Positioning fixture 40 also includes a ball engaging portion 44. Portions 42 and 44 are adapted to cooperate with the housing 12 and the ball 36 to maintain the ball 36 in the desired spaced position within housing 12. Portions 42 and 44 of fixture 40 are also adapted to sealingly engage both the housing 12 and the ball 36 so that bearing material injected into the space between the ball and the housing may be pressurized. To aid in sealing between housing 12 and housing engaging portion 42 a clamping force may be applied to housing 12 and fixture 40 so that shoulder 46 of housing 12 seats tightly against shoulder 48 of fixture housing engaging portion 42.

A suitable injection fitting 56 is then fitted into passage 34. Plastic bearing material 16, such as the thermo plastic material used in typical prior art ball joints, is then injected through passage 34 to fill the space between ball 36 and housing 12, as shown in FIG. 4. The injected bearing material 16 is then allowed to congeal or harden under pressure while in contact with the ball 36 in the cavity 22. The seal between ball 36, fixture 40 and housing 12 may be maintained as the bearing material 16 congeals so that, due to the pressurization of the bearing material 16, the congealed bearing material 16 applies a preload to ball 36 in cavity 22 in the finished ball joint 10. It may also be desirable to rotate ball 36 as the bearing material 16 congeals so that the bearing material 16 forms a smooth bearing surface adjacent ball 36. The congealed bearing material 16 cooperates with retaining groove 28 to aid in holding the bearing material 16 within cavity 22.

The congealed bearing material 16 maintains ball 36 in the proper spaced position within cavity 22 while at the same time allowing free rotation of ball 36 within cavity 22. The preloaded bearing material 16 provides the ball joint 10 with a wear take-up capability.

Figure 1:
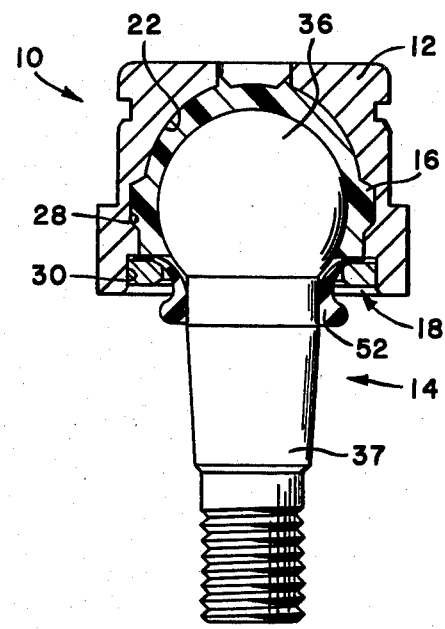
FIG. 1 is a longitudinal cross-sectional view of a completed ball joint assembly manufactured according to the applicant's invention.

The positioning fixture 40 and the injection fixture 50 are removed after the bearing material 16 has congealed and a retaining ring 18 is press fitted into retaining groove 30 as shown in FIG. 1. A single positioning fixture (not shown) may be adapted to simultaneously or sequentially position ball 36 within cavity 22 and also press retaining ring 18 into groove 30. The retaining ring 18 provides additional structural integrity to the assembled ball joint 10. Retaining ring 18 may include a bonded rubber boot 52 to prevent stud 37 from engaging retaining ring 18 as the ball 36 pivots and to protect the assembled ball joint from contamination.

It is be possible to provide an alternate positioning fixture (not shown) which itself includes passages for introducing the plastic bearing material into the cavity 22 and for simultaneously venting air from the cavity.

With such a fixture, passage 34 in the housing 12 could be eliminated.

I claim:

1. A method of constructing a ball joint comprising the steps of:

forming an open-ended ball-receiving cavity in a housing;

inserting a ball with a stud projecting therefrom through said open end of said cavity and into said cavity to a position in which the ball cooperates with the wall of the cavity to define a chamber therebetween and in which the stud projects away from the housing;

engaging said ball and said housing with a fixture to control the dimension of said chamber, said fixture including a shoulder extending from said ball to said housing;

injecting a pressurized plastic bearing material into said chamber to engage said plastic bearing material with said fixture shoulder and completely fill said chamber;

allowing said plastic bearing material to congeal in said chamber with the ball in contact with the bearing material;

rotating said ball on said fixture as said bearing material congeals while maintaining said bearing material under pressure;

attaching a retaining ring to said housing adjacent said open end of said cavity to retain said ball and said bearing material within said cavity.

* * * * *